United States Patent [19]
Kurtz

[11] Patent Number: 6,089,596
[45] Date of Patent: Jul. 18, 2000

[54] EASY ATTACHING HITCH

[76] Inventor: William C. Kurtz, 2187 State Rd. #87, St. Croix, Wis. 54024-7851

[21] Appl. No.: 08/598,658

[22] Filed: Feb. 8, 1996

[51] Int. Cl.[7] .................................................. B60D 1/01
[52] U.S. Cl. ........................... 280/733; 280/510; 280/504
[58] Field of Search ................................. 280/510, 508, 280/477, 504

[56] References Cited

U.S. PATENT DOCUMENTS

| 793,184 | 6/1905 | Finlay | 280/510 |
|---|---|---|---|
| 831,977 | 9/1906 | Nilsen | 280/510 |
| 854,292 | 5/1907 | Inghram | 280/510 |
| 1,136,564 | 4/1915 | Todd | 280/510 |
| 1,139,657 | 5/1915 | Fitzgerald | 280/510 |
| 1,437,836 | 12/1922 | Ferris | 280/508 |
| 2,597,096 | 5/1952 | Harris | 280/33.15 |
| 4,225,149 | 9/1980 | Koopman | 280/477 |
| 5,244,047 | 9/1993 | Eudy | 172/275 |

FOREIGN PATENT DOCUMENTS

| 1077987 | 3/1960 | Germany | 280/510 |
|---|---|---|---|

*Primary Examiner*—Christopher P. Ellis
*Assistant Examiner*—Kevin McKinley

[57] ABSTRACT

A quick attaching device for attaching a powered vehicle, ordinarily a farm tractor, to an implement without leaving the vehicle. The system is adaptable to implements having either a pulling tongue or having a relatively fixed attachment to the vehicle.

10 Claims, 2 Drawing Sheets

EASY ATTACHING HITCH

BACKGROUND AND SUMMARY OF THE INVENTION

This invention pertains to a continuing problem for farmers who are bothered by having to dismount farm tractors to make or release tongues or other attaching devices for implements from tractors.

The problem is of long standing and there have been a large number of proposals and devices intended to solve the problem. Failure in that effort is also common as may be seen by the current lack of a successful system. The reasons may also be numerous and varied. Some systems are particularly adapted to small tractors, others may be exactly the opposite in that they are useful principally with large tractors. Many systems are useful only with a tongued trailing type implement. Some require powered attachment and release means.

By the present invention, applicant provides a relatively simple mechanical system usable on many different sizes of tractor; one which is readily understood and therefore readily reparable by the user. It is usable both with a pulling tongue or, with a simple adaptation, for use in fastening a fixed implement such as a hay fork to the tractor.

The embodiment of the invention is a relatively simple device using the gravitational forces for latching and for holding the latch in an open position when unlatched. Only the actual release of the latch by the operator of the device and the opening of the latch requires external forces—in the first case by means of a rope or similar expedient pulled by the operator. In the second case by the expedient of driving the tractor away from the implement.

A more complete understanding may be had from a reading of the following specification in connection with the figures in which:

DESCRIPTION

Briefly this invention comprises a guard attaching hitch for connecting a tractor to an implement. The hitch is completely mechanical in its engagement with the implement and in its latching and release. The only power used is the human power of the operator in the release of the latching and the power of gravity which causes the hitch to latch and which holds the latch out of engagement when it is open. It will be apparent that a spring device could be used if desired.

Figure 2:
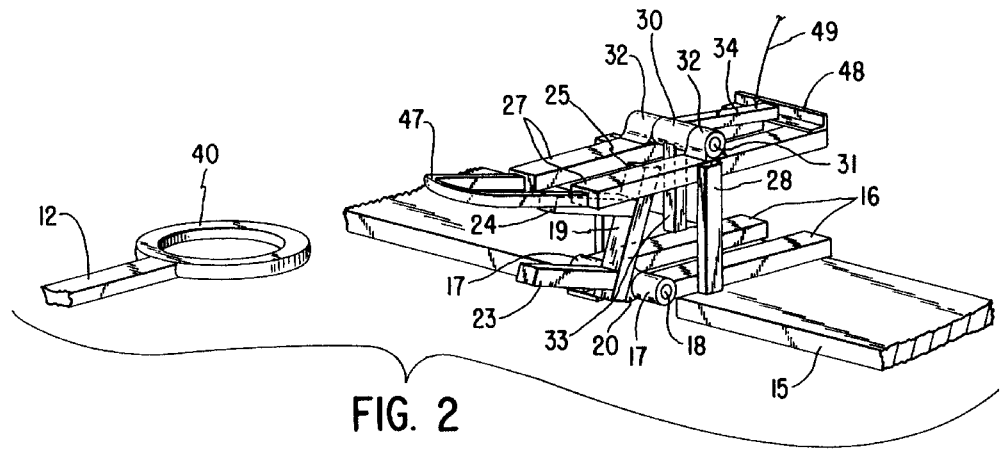
FIG. 2 is a more detailed perspective drawing of the attaching device in its open position ready to receive the tongue of a implement.
Figure 1:
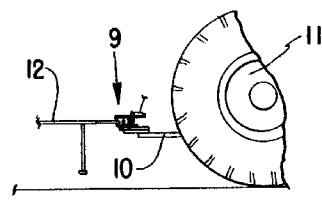
FIG. 1 is an elevation drawing to a small scale of the device connected between a tractor and a tongued implement.

More specifically, the latch shown in FIG. 1 generally at 9 is fixed to a drawbar 10 or alternatively at three-point hitch device on a tractor 11 and is engaged with the tongue 12 of an implement. The details of the hitch are best shown in FIGS. 2 and 3 and are described hereinafter.

The hitch is illustrated as mounted on a cross bar 15 of a three point hitch on the tractor 11 or to a similar flat plate extending transversely of the tractor. A pair of bars 16 fastened to the plate 15, preferred by welding, forms a base for the hitch device. These bars, at the end away from the tractor are formed with bearings 17 which receive an axle 18.

A tilting latch device including a base bar 19 having an ear 20 through which the axle 18 extends from the principal connection between the tractor and the implement. Extending upwardly from the bar 19 are two parts: a linking post 23 and a trigger part 24. It will be apparent that the bar 19 can tilt from a flat position shown in FIG. 3 to the tilted position shown in FIG. 2.

Figure 3:
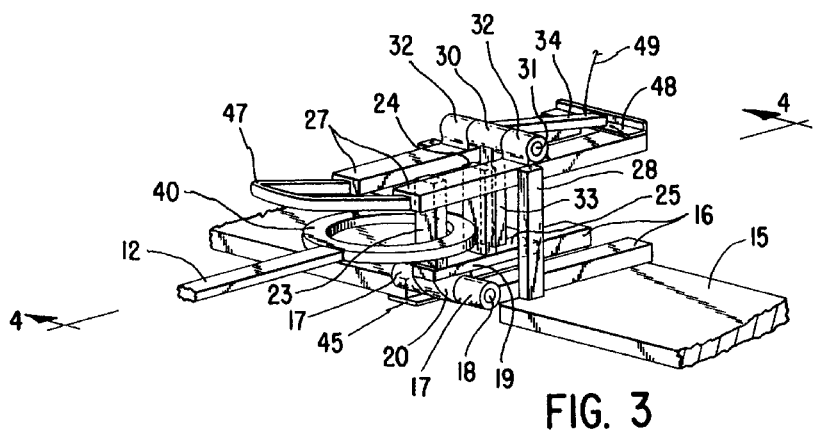
FIG. 3 is a view similar to FIG. 2 of the attaching device in a closed position engaging the tongue.
Figure 4:
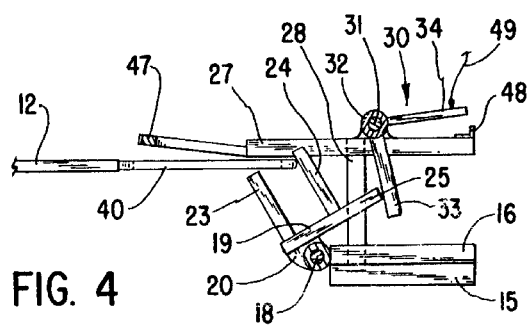
FIG. 4 is a detailed sectional view from line 4—4 of FIG. 3.

As best shown in FIG. 3 and 4, the bar 19 extends beyond the trigger part 24 to form an extension 25 adapted to be engaged by a blocking bar described later.

Above the base bar is a superstructure including a pair of upper arms 27 supported by a pair of vertical columns 28. An L-shaped locking member 30 is jointly mounted on these upper arms 27 an axle 31 journalled in bearing blocks 32 on the arms 27. The locking member 30 is composed of an engagement arm 33 and a release arm 34. The release arm 34 has a flexible connector 49 such as a rope, cable, chain or the like attached to it. That connector is adapted to extend to a point adjacent the operator of the tractor so that it can be pulled and then can cause the member 30 to be pivoted around the axle 31.

In the use of the device as a coupler between the tractor and a trailed implement, the tractor 11 may be backed toward the tongue 12 of the implement. This tongue should include some sort of engagement loop 40. In the illustration of the trailed implement in FIGS. 2–4, the loop is indicated to nearly circular. It will be obvious that a loop with a rectangular or square or even some other shaped opening could equally serve the purpose so long as the linking post 23 can be readily inserted into the loop.

Initially, the latch should be in the open position as shown in FIG. 2. Here the linking post 23 and trigger post 24 are tilted toward a horizontal position but may be held slightly short of horizontal by a stop bar 45 extending from one of the sides of the plate 15 (FIG. 3). This bar is placed to stop downward motion of the ear 20 of the latch device by extending into its path of motion. Thus, in an open position as shown in FIG. 2, the posts 23 and 24 may be stopped just before they reach horizontal.

Backing of the tractor 11 toward the implement tongue 12 will then bring the circumference of the loop 40 into contact with either the triggering bar 24 or the base bar 19 and will tend to cause the latch device to tilt back. It should be noted that in the open position (FIG. 2) the weight of the posts 23 and 24 is principally on the side of the axle 18 which would cause the tilt to be maintained in that position. However, as the tilting machine is moved backward, the weight shifts from one side of the axle to the other and then the tiling mechanism tends to fall to the position shown in FIG. 3 where the posts 23 and 25 are substantially vertical with the linking post 23 linked into the loop 40.

In order to be sure the loop 40 is at nearly the right level to be engaged, a guide 47 may be built into or onto the upper arms 27. The slope of that guide may be effective to be sure the loop 40 is in position to be engaged with the post 23.

As best shown in FIG. 2, the extension 25 of the base bar 19 will engage and press backward on the arm 33 of the locking member 30 causing that member to tilt in a counterclockwise direction in the figures. This tilting simply moves the L-shaped member 30 so that the arm 33 is out of the way of the extension 25 which can then fall to a substantially vertical position to be stopped there by engagement of the release arm 34 with a stop bar 48. In that position, the top of the extension 25 is in position to engage the lower end of the engagement arm 33, thus blocking any movement of the latching member and holding the post 23 in position to prevent release of the ring 40.

To release the ring, it is necessary only for the operator of the device to pull on the rope 49 to pull the L-shaped member pivotally about the axle 31 until the engagement between the arm 33 and the extension 25 of the base bar 19 is released. Pulling of the loop 40 on the post 23 will then cause the tilting latch to tilt back to the position of FIG. 2 where the loop will be released from the post 23 and the joining of the tractor to the implement will be released and the latch mechanism open to receive another loop of another tongue.

Figure 5:
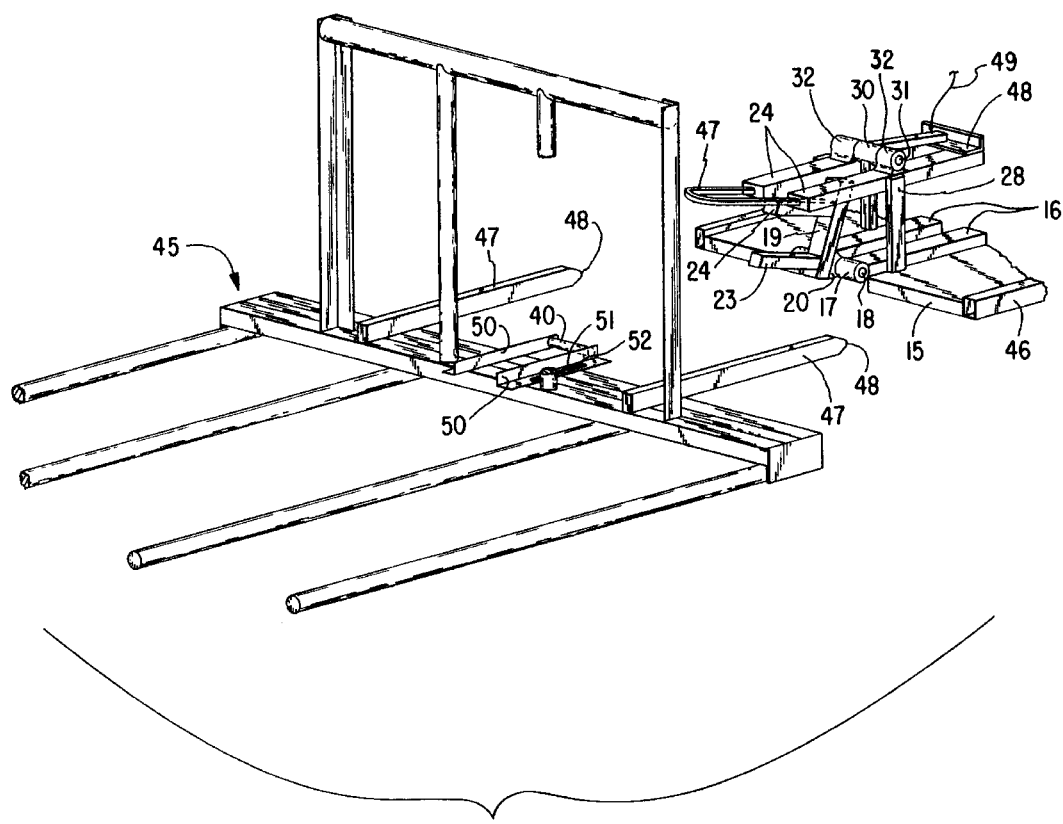
FIG. 5 is a perspective view of an alternative embodiment used with a fixed implement.

An alternative embodiment of my invention is shown in FIG. 5. This figure shows how my invention can be used to mount a hay fork or other relatively fixed device onto the tractor. The hitch operating mechanism is the same as that previously described, having a linking post 23 pivoted about an axle 18 and adapted to hook onto a bar 40 fixed to a device such as a hay loader 45. That bar 40 is fixed between a pair of arms 50 which may be adjustably attached to the loader. This attachment may be by bolts 51 engaged in slotted openings 52 in the bars 40 so that the bars can be slid toward and away from the hitch.

The difference between this and previously described embodiments is in the usage. Previously, the hitch was described as being useful with a pulled device. In this embodiment applicant shows its usefulness in mounting an implement intended to be operated by the tractor. In FIG. 5, a hay loader 45 is illustrated having the loop 40 attached thereto. In order to accomplish a relatively firm mounting on the three point hitch of the tractor, the plate 15 carries a socket member 46 on each of the lateral edges. These socket members are adapted to receive elongated prongs 47. These prongs which may have pointed ends 48 to guide them into the sockets 46 are sized to fit into the socket members 46 deep enough to provide a stable support for the loader 45 (or other tool of similar nature). The engagement between the linking post 23 and the loop 40 is then sufficient to hold the loader in place so that the three-point hitch of the tractor becomes useful as an operating device for the loader.

Thus, not only is the hitch convenient for use with a trailing implement, but it is also useful for keeping a mounted tool in place.

I claim as my invention:

1. A quick attachment device for use in holding a farm tractor in engagement with an implement, said tractor having a hitch means including a tow bar which is moveable vertically, said quick attachment device having a base fixed to said tow bar, latch means pivotally mounted on said base, said latch means including a linking post carried by said latch means from a nearly horizontal position to a nearly vertical position as said latch means is tilted, said implement including a loop device adapted to be releasably disposed over said linking post depending on the position of said post, interference means mounted on said base in position to engage with said latch means when said linking post is in its nearly vertical position for holding said latch means in the nearly vertical position.

2. The quick attachment device of claim 1 in which release means is engaged with said interference means, said release means being adapted to release said interference means from said latch upon action from an aperture of said tractor.

3. The quick attachment device of claim 1 in which said implement includes at least two elongated prongs, said tow bar including sockets adapted to be filled by said prongs whereby said implement may be securely mounted on said tractor, said loop means being located nearly midway between said two prongs.

4. The quick attachment device of claim 1 in which said base includes a superstructure on said base, said interference means being movably mounted on said superstructure above said latch means, an extension on said latch means being in position to be engaged by said interference means to hold said latch means in the position in which said linking post is in its nearly vertical position, said interference means being movable out of a holding relationship with said latch means to allow said latch means to tilt to said position in which said linking post is nearly horizontal.

5. A quick attachment device for use in holding a farm tractor in engagement with an implement, said tractor having a hitch means including a tow bar which is moveable vertically, said quick attachment device having a base fixed to said tow bar, latch means pivotally mounted on said base, said latch means including a linking post carried by said latch means from a nearly horizontal position to a nearly vertical position as said latch means is tilted, said implement including a loop device adapted to be releasably disposed over said linking post depending on the position of said post, said latch means also including a trigger part extending substantially parallel to said linking post in a position such that when said linking post is in its substantially horizontal position said trigger part will normally be engaged by said loop to start the tilting of the linking post through the loop to its nearly vertical position.

6. The quick attachment device of claim 5 in which a guide is fixed to said superstructure to guide said loop into engagement with said linking post.

7. The quick attachment device of claim 5 in which said latch means comprises a base bar pivotally mounted on an axle on said base, said linking post extending from said base bar approximately perpendicular therein, said base bar extending beyond said linking post to provide for said position in which said interference means engages said base bar.

8. The quick attachment device of claim 7 in which a trigger post also is mounted on said base bar, said trigger post being substantially parallel to said linking post but being spaced on said base bar in a direction away from said axle, said base bar extending beyond said trigger post.

9. The quick attachment device of claim 8 in which said axle is located so that gravity will tend to hold said latch means in both positions of said linking post.

10. The quick attachment device of claim 9 in which stop means are located on said tow bar in position to engage said latch means to prevent movement of said base bar beyond the position in which said linking post is nearly horizontal.

\* \* \* \* \*